United States Patent [19]

Bailey et al.

[11] Patent Number: 4,934,203
[45] Date of Patent: Jun. 19, 1990

[54] POWER ARM

[76] Inventors: Thomas R. Bailey, 12303 E. Marginal Marginal Way, Seattle, Wash. 98168; Richard C. Hall, 5301 Southcenter Blvd., P.O. Box 68946, Seattle, Wash. 98188

[21] Appl. No.: 294,172

[22] Filed: Jan. 6, 1989

[51] Int. Cl.⁵ .................. F16H 25/22; F16H 25/24
[52] U.S. Cl. .................. 74/89.15; 49/340; 74/424.8 R; 74/424.8 NA; 254/103; 254/DIG. 2
[58] Field of Search ..... 74/89.15, 424.8 R, 424.8 NA; 254/98, 103, DIG. 2; 49/340, 344, 356

[56] References Cited

U.S. PATENT DOCUMENTS

| 1,540,490 | 6/1925 | Mertel | 49/381 |
|---|---|---|---|
| 2,283,862 | 5/1943 | Peremi et al. | 49/343 |
| 2,371,336 | 3/1945 | Levon | 49/340 |
| 2,438,545 | 3/1948 | Davidson | 74/424.8 R X |
| 2,594,643 | 4/1952 | Gustisha | 49/343 |
| 2,739,491 | 3/1956 | Russell | 74/424.8 NA X |
| 2,768,532 | 10/1956 | Russell | 49/340 |
| 2,927,627 | 3/1960 | Lohr | 74/424.8 R X |
| 3,101,134 | 8/1963 | Winkelmann, Sr. | 254/98 X |
| 3,244,401 | 4/1966 | Iimura | 254/103 |
| 3,269,199 | 8/1966 | Deehan et al. | 254/103 X |
| 3,439,455 | 4/1969 | Ford | 49/381 |
| 4,185,720 | 1/1980 | Wright, Jr. et al. | 74/424.8 R X |
| 4,229,983 | 10/1980 | Morita | 74/424.8 NA X |
| 4,434,578 | 3/1984 | Rumpz | 49/340 X |
| 4,598,238 | 7/1986 | Scarano | 74/424.8 R X |
| 4,665,650 | 5/1987 | Hall | 49/334 |
| 4,735,018 | 4/1988 | Duncan et al. | 49/340 |
| 4,817,977 | 4/1989 | Bookbinder | 254/98 X |

OTHER PUBLICATIONS

Brochure and Drawings, "Fadini the Gate Opener", four pages, (undated).

Primary Examiner—Allan D. Herrmann
Attorney, Agent, or Firm—T. W. Secrest

[57] ABSTRACT

This invention is directed to a mechanical means for moving a member such as a gate. The mechanical means comprises a screw which can be extended and can be retracted for moving and for rotating the member. There is a power means for rotating the screw and a control for the power means.

36 Claims, 3 Drawing Sheets

POWER ARM

THE BACKGROUND OF THE INVENTION

The remote opening and closing of a gate is desirable. Such a gate may make it possible to operate a facility with fewer employees which translates into less cost for operating the facility.

A gate is used to control the movement of objects.

An example is a transportation facility such as an airport, a bus terminal and a railroad station. A gate is used to direct people to a loading area or to an unloading area. With a gate closed people cannot go to the transportation vehicle or people are directed to a less congested area. If an operator manually opens and closes the gate it is necessary for the operator to go to the gate. This requires the time of the operator and which time translates into the cost of the operation of the facility. Also, with the operator manually operating the gate means the operator is precluded from doing another task. If the gate were remotely controlled the operator would not have to go to the gate. Instead the operator could operate the control station for the gate and accomplish the closing or the opening of the gate. There would be a saving in time and if there were a large number of gates at the facility it is conceivable that fewer operators or fewer employees would be needed.

Another example is with the controlling of livestock at an auction yard or in a feedlot. Cattle are directed to different areas and to different pens or may be directed to the weighing scale or to the loading area. In many such facilities an operator walks behind the cattle to herd them into the desired area. When a gate is encountered it is necessary for the operator to move through the cattle to open the gate and then to close the gate. This is a time consuming operation and at times can be a messy operation. Also, at an auction yard or in a feed lot there are a large number of gates. The operator must walk to the gate for closing and opening the gate which is time consuming. If the gate were remotely controlled the operator could more quickly and more easily open the gate and close the gate compared with a manually controlled gate. With a large number of gates it is conceivable that fewer operators would be needed for remotely controlled gates as compared to manually controlled gates. The result is a saving in the cost of operation of the auction yard or the feedlot.

A BRIEF DESCRIPTION OF THE INVENTION

This invention is directed to a mechanism for rotating a gate.

The mechanism has a first end and a second end.

One end is attached to a bearing member or a stationary member.

The other end is attached to the gate.

The mechanism comprises a screw. There is a means for driving or for rotating the screw. There is a moveable ballnut on the screw. There is a ball bearing sleeve between the moveable nut and the screw and which sleeve moves on the screw. There is a tubular member on the moveable ball nut and which tubular member moves with the moveable nut. The tubular member operatively connects with the gate. The means for rotating the screw operatively connects with the bearing member. With the rotation of the screw the moveable nut and the tubular member move so as to rotate the gate.

THE DRAWINGS

In the drawings it is seen that

THE SPECIFIC DESCRIPTION OF THE INVENTION

With reference to the drawings it is seen that the invention comprises a power arm 20 which in turn comprises a screw 22, a motor 24, a gear box 26 and an adapter 28 between the motor 24 and the gear box 26.

A ball nut means 21 can be described as a screw 22 having screw threads 20. A nut 32 having internally tapped threads 34 is positioned on the screw 22. A sleeve is positioned between the screw 22 and the nut 32. The sleeve 36 has a number of openings 38 for receiving ball bearings 40. The ball bearings 40 are positioned in the screw 22 and also in nut 32. With the rotatin of the screw 22 the nut 22 moves and likewise the sleeve 36 moves. If the screw rotates so as to have the nut near the gear box 26 or abutting the gear box 26 and the motor continues to operate and the screw continues to rotate the nut 32 will free wheel on the screw 22 so as not to bind the screw and not burnout the motor by allowing the screw to continue to rotate and by allowing the motor to continue to operate. Likewise, if the nut 32 is on the outer end of the screw 32 and is bearing against a component and cannot move the nut 32 will freewheel on the screw 22 so as to allow the screw to continue to rotate and to allow the motor to continue to run and thereby preclude binding the screw and the motor and therefore preclude burning out the motor. This feature is desirable as it is a safety factor as it allows the motor to continue to operate and allows the screw to continue to rotate even though the screw cannot move away from or move toward the gear box. As a result the motor can continue to run without burning out. The sleeve 36 and the ball bearings 40 make this possible.

Figure 5:
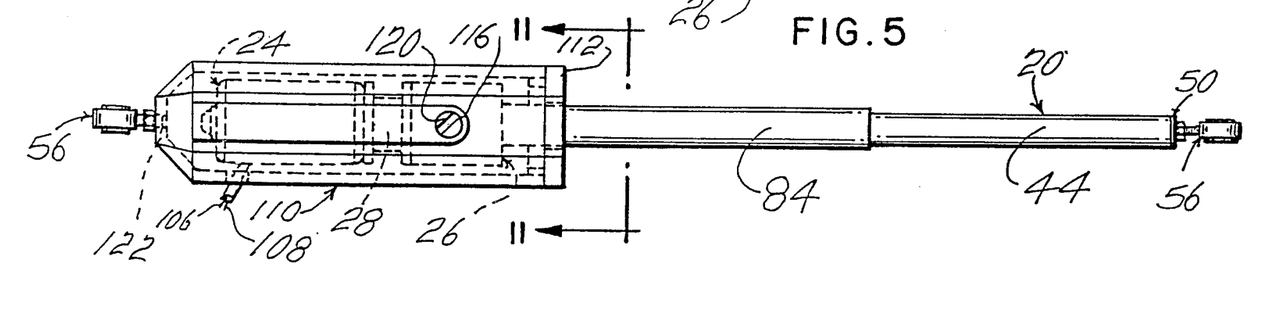
FIG. 5 is a view showing the mechanism for moving the gate and shows the housing for the motor, the adapter, the gear box and part of the tubular member and the rod end adapters.
Figures 9, 10, 11:
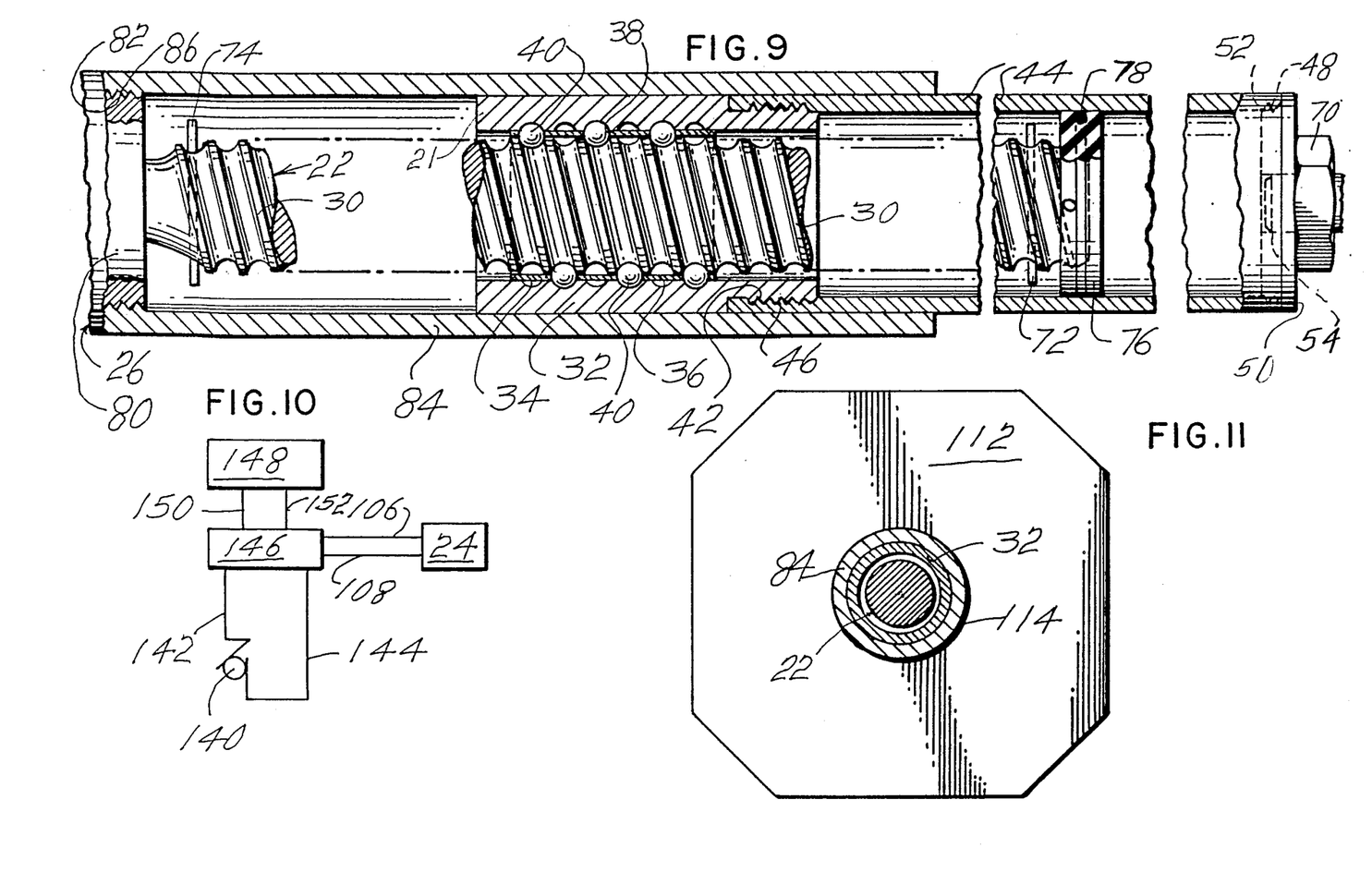
FIG. 9 is a fragementary longitudinal cross-sectional view of the screw, the nut attached to the screw and the tubular member attached to the nut and the bearing sleeve between the screw and the nut and with the nut extended on the screw and near the outer end of the screw and with the ball bearing sleeve near the end of the screw.
FIG. 10 is a schematic illustration of an electrical control for the mechanism for moving the gate and illustrates a source of electricity from a generator, a control panel, a solar panel and the motor for driving the gear box and for rotating the screw.
FIG. 11 is a lateral cross-sectional view taken on line 11—11 of FIG. 5 and illustrates the configuration of the housing for housing the motor, the gear box and the inner part of the screw.

In FIGS. 5 and 9 it is seen that the nut 32 on its outer end has external threads 42. There is a tubular moveable member 44 having internally tapped threads 46. The tubular moveable member 44 is screwed onto the nut 32. The member 44 moves with the movement of the nut 32.

The outer end of the member 44 has internally tapped threads 48. There is a cap 50 having external threads 52. In the cap 50 there is tapped opening 54.

Figures 1, 7:
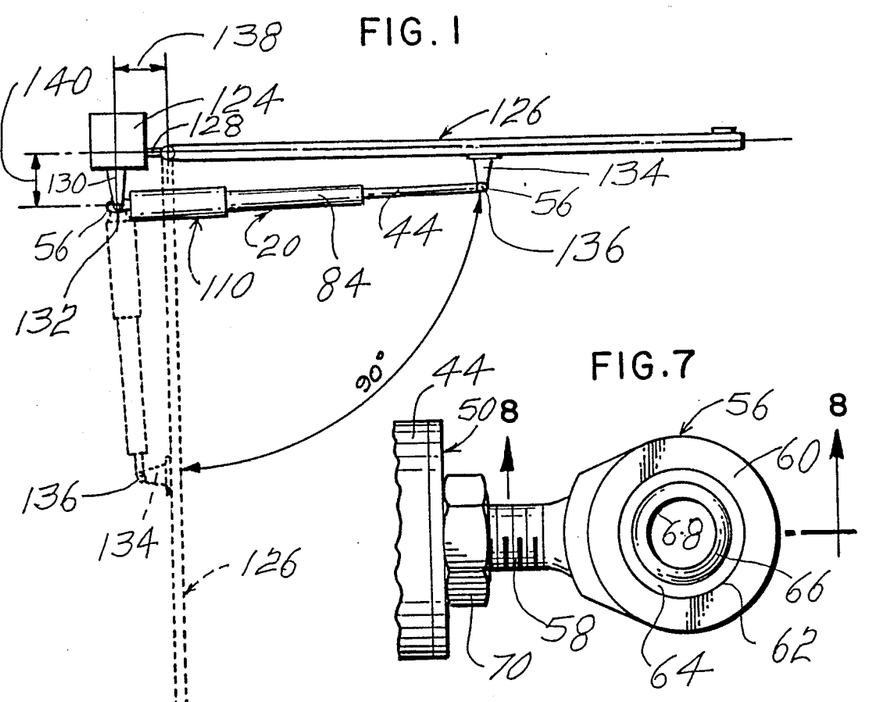
FIG. 1 is a plan view of the power arm connected to a gate and in one presentation the power arm and the gate are in solid line and in another presentation the power arm and the gate are in phantom line and wherein the solid line and the phantom line are at 90 degrees with each other.
FIG. 7 is a plan view, on an enlarged scale, of the rod end for attaching to the bearing member and also for attaching to the gate.

There is an eye bolt 56 having a threaded shank 58. The eye bolt 56 has a rod end 60 with a circular opening 62. There is a circular spacer 64 in the opening 62. In the circular spacer 64 there is a rotatable moveable torus 66. In the torus 66 there is a passageway 68. The torus 66 can move and rotate so as to accomodate itself to the member with which it connects. In FIG. 7 it is seen that there is a lock nut 70 on the threaded shank 58 and which nut 70 bears against the cap 50 so as to firmly position on the cap 50.

Figure 6:
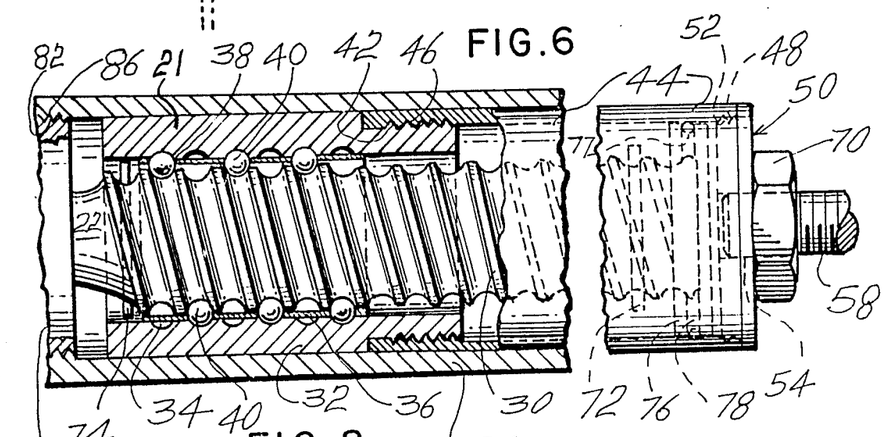
FIG. 6 is a fragmentary longitudinal cross-sectional view of the screw, the nut attached to the screw and the tubular member attached to the nut and the bearing sleeve between the screw and the nut and with the nut retractred on the screw and near the motor and with the ball bearing sleeve near the motor.
Figure 8:
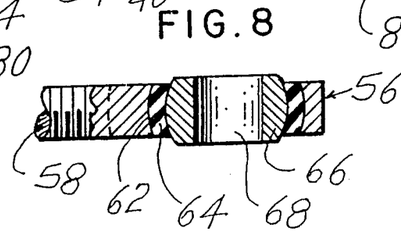
FIG. 8, taken on line 8—8 of FIG. 7, is a lateral cross-sectional view of the rod end and shows the housing, the moveable torus in the housing and the cushion between the housing and the torus.

In FIG. 6 it is seen that there is a pin 72 positioned in the screw 22 near the free end of the screw near the cap 50. Also in the screw 22 near the gear box 26 there is positioned a pin 74. The pins 72 and 74 limit the travel of the sleeve 36 on the screw 22.

On the free end of the screw 22 there is positioned a circular guide 76 having a circumscribing recess 77 for receiving an O-ring 78.

On that end of the gear box 26 near the screw 22 there is a unitary tubular projection 80 having external threads 82. There is a guide tube 84 having internally tapped threads 86. The guide tube 84 is screwed onto the unitary tubular projection 80. The internal diameter of the guide tube 84 is greater than the external diameter of the nut 32 and the moveable member 44 so as allow the free movement of the nut 32 and the member 44 in the guide tube 84.

Figures 2, 3, 4:
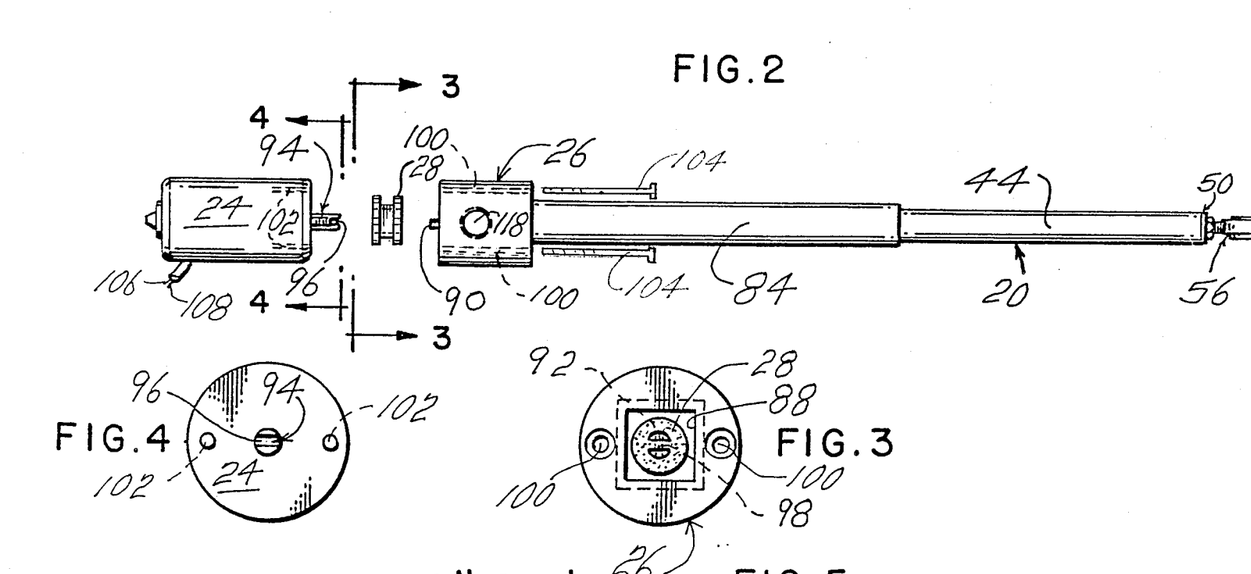
FIG. 2 is a partially exploded view of the power arm and shows the motor, an adapter and the combination of the gear box and the tubular member surrounding the screw (not shown)
FIG. 3 is a view taken on line 3—3 of FIG. 2 and shows the adapter in the housing of the gear box.
FIG. 4 is a view taken on line 4—4 of FIG. 2 and shows the drive shaft of the motor and the tapped holes in the motor housing for receiving connecting bolts.

In FIG. 3 it is seen that in the gear box 26 there is a recess 88 having configuration of a square. The adapter 28 is positioned in this recess 88. The gear box 26 has a clevis 90 for mating with and for receiving a lateral member 92 of the adapter 28. The clevis 90 is the free end of the driven shaft leading into the gear box 26. The motor 24 has a drive shaft 94 which on its end has a clevis 96. That end of the adapter 28 near the motor 24 has a lateral member 98 for mating with and for receiving the clevis 96 of the motor. The drive shaft 94 of the motor 24 drives the clevis 90 of the driven shaft of the gear box 26 which in turn operatively connects with the screw 22 to rotate the screw 22.

In FIGS. 2 and 3 it is seen that in the gear box 26 there are two spaced apart passageways 100. In the motor 24 are two spaced apart tapped passageways 102. Bolts 104 are positioned in the passageways 100 and screwed into the tapped passageways 102 to unite the gear box 26 and the motor 24. In FIG. 2 it is seen that there are two wires 106 and 108 connecting with the motor 24. The wires connect with a source of electricity, viz., 24 volts, for driving and for powering the electric motor 24. The adapter 28 is of such a size as to fit in the recess 88 in the gear box 26 as illusrated in FIG. 3.

In FIGS. 5 and 11 there is illustrated a housing 110 for the motor 24, the gear box 26 and the inner part of the screw 22. The housing 110 is of cast aluminum and is hollow or tubular. In FIG. 11 there is a cover 112 for the housing 110. It is seen that the housing 110 has eight sides, four short sides and four long sides. The cover 112 has a central passageway 114 and in which there is positioned a moveable member 84, the screw 22 and sometimes the nut 32.

In FIG. 5 it is seen that in the housing 110 there is a passageway 116. Actually, there are two passageways 116, on opposite sides of the housing 110. In the gear box 26 there are two tapped holes 118 and which holes are aligned with the passageways 116 for receiving set screws 120 for uniting the housing 110 with the gear box 26. In the closed end of the housing 110 there is a tapped passageway 122 for receiving an eye bolt 56.

In FIG. 1 there is a schematic illustration of the power arm 20 as used with a gate. There is a gate post 124 or bearing member 124 and a gate 126. A hinge 128 connects with the gate post 124 and the gate 126. On the gate post 124 there is a trunnion 130. The hinge 128 and the trunnion 130 are at right angles to each other. In the trunnion 130 there is a hole or passageway. A pin 132 is positioned in the passageway 68 in the eye bolt 56 and in the hole in the trunnion 130 to operatively connect the gate post and the power arm 20. The pin 132 may be a bolt or other suitable connecting means. On the gate 126 there is a trunnion 134 having a hole. A pin 136 is positioned in the passageway 68 in the eye bolt and in the hole in the trunnion 130 to operatively connect the gate 126 and the power arm 20. The gate post 124 is the stationary member on which the power arm 20 can bear or is the bearing member for allowing the power arm 20 to rotate the gate 126. With the actuation of the power arm 20 the gate rotates.

In FIG. 10 there is a schematic illustration of the control unit for the power arm 20. There is illustrated a generator 140 having wires 142 and 144 connecting with a control panel 146. The control panel 146 connects with the motor 24 by wires 106 and 108. The generator 140 normally supplies the electrical energy to the control panel 146 and the motor 24. In certain instances there may be used a solar panel 148 for generating electricity. The solar panel 148 connects by wires 150 and 152 with the control panel 146. The solar panel 148 may be used in conjunction with the generator 140 or may be used by itself. With the use of the solar panel there is also used batteries. The motor is a 24 volt motor. With a line source of 120 volts this means that there is a transformer in the control unit for reducing the line voltage to 24 volts.

The particular unit we built has a travel distance of eleven inches for the screw 22. With a travel distance of eleven inches and for the gate to rotate 90 degrees, see FIG. 1, it is necessary that the length 138 equal the length 140 with the sum of 138 and 140 equal to eleven inches. The length 138 is the distance from the center of the gate post 124 to hinge support on the gate 126. The length 140 is the distance from the hinge 128 to the center of the passageway 68 in the eye bolt 56 on the housing 110. If the length 138 is not equal to the length 140 the gate will rotate other than 90 degrees. This is one way of controlling the degree of rotatin of the gate 126.

A patent search was made prior to the preparation of this patent application. The results of the patent search are:

| PATENTEE | U.S. Pat. No. |
|---|---|
| RUMPZ | 4,434,578 |
| PEREMI ET AL. | 2,283,862 |
| GUSTISHA | 2,594,643 |
| MERTEL | 1,540,490 |
| LEVON | 2,371,336 |
| FORD | 3,439,455 |
| RUSSELL | 2,768,532 |
| DUNCAN ET AL | 4,735,018 |
| HALL | 4,665,650 |

A copy of each of these patents accompanies this application.

A publication of meccanica FADINI s.n.c. of Italy relating to automatic gate openers accompanies this application. It is to be noted that this gate opener comprises a hydraulic piston.

Richard C. Hall has a U.S. Pat. No. 4,665,650, issuing date of 19 May, 1987, and entitled CONTROL GATE ASSEMBLY. A copy accompanies the filing of the patent application.

Most of the components for the gate opener of this invention were purchased commercially. Some parts were fabricated. The entire gate opener was assembled from fabricated and purchased parts.

A gate can assume many forms. A gate can rotate horizontally. Most of the gates in a livestock auction yard or in a feedlot rotate horizontally. A door is essentially a gate and most doors rotate horizontally. A gate can rotate vertically. An example of such a gate is the single bar or single rod at a railroad crossing. There is not sufficient room to have a horizontally rotating gate. Therefore the gate must rotate vertically. The power arm 20 and the gate of this invention attached to the power arm can rotate horizontally or can rotate vertically. The movement of this power arm can be in a horizontal plane or can equally be in a vertical plane such as for moving the rod or bar at a railroad crossing. FIG. 1 can be interpreted as the gate 126 moving horizontally or as moving vertically. A gate can be a single piece of material such as a metal pipe or a plastic pipe or a piece of lumber. Or, a gate can be a sheet of material such as a sheet of plywood, a sheet of metal or a sheet of plastic. Or, a gate can be of a more decorative structure. The power arm 20 of this invention will work with any of these gates.

The adaptor 28 is resilient to absorb shock between said motor and said gear box.

We consider that invention to be a straight forward structure. When the power arm is used with a gate it is possible for an operator at a remote position from the gate to control the opening and the closing of the gate. If there be a large number of gates there is a saving in time as the operator need not travel to the gate to control and to open the gate. The operator can sit at a control panel and control the opening and the closing of the gate this. With a large number of gates there is a considerable saving in time and there is possibility that fewer operators will be required as compared with the manual opening and closing of gates.

From the foregoing it is seen that we have provided a power arm comprising an electric motor having a drive shaft; a gear box having a driven shaft; said electric motor and said gear box operatively connecting together; an adapter operatively connecting with said drive shaft and with said driven shaft; a housing having a cavity for receiving said electric motor and said gear box; said electric motor and said gear box being positioned in said cavity in said housing; a guide tube operatively connecting with said gear box; a screw operatively connecting with said gear box and being in a driven relationship with respect to said gear box; a ball nut mounted on said screw and being capable of moving on said screw; said ball nut being inside of said guide tube and being capable of moving inside of said guide tube; a tubular moveable member connecting with said ball nut and moving with said ball nut; a first attaching means operatively connecting with said housing; and, a second attaching means operatively connecting with said tubular member.

Further it is seen that we have provided a process for making a power arm and comprising selecting an electric motor having a drive shaft; selecting a gear box having a driven shaft; operatively connecting together said electric motor and said gear box; operatively connecting together an adapter with said drive shaft and with said driven shaft; selecting a housing having a cavity for receiving said electric motor and said gear box; positioning said electric motor and said gear box in said cavity; operatively connecting a guide tube with said gear box; operatively connecting a screw with respect to said gear box and with said screw being in a driven relationship to said gear box; mounting a ball nut on said screw and with said ball nut being capable of moving on said screw; positioning said ball nut inside of said guide tube and being capable of moving inside of said guide tube; operatively connecting a tubular member with said ball nut and said tubular member being capable of moving with said ball nut; operatively connecting a first attaching means with said housing; and, operatively connecting a second attaching means with said tubular member.

In addition it is seen that we have made a power arm by the process comprising selecting an electric motor having a drive shaft; selecting a gear box having a driven shaft; operatively connecting together said electric motor and said gear box; operatively connecting together an adapter with said drive shaft and with said driven shaft; positioning said electric motor and said gear box in said cavity; selecting a housing having a cavity for receiving said electric motor and said gear box; operatively connecting a guide tube with said gear box; operatively connecting a screw with said gear box and with said screw being in a driven relationship with respect to said gear box; mounting a ball nut on said screw and with said ball nut being capable of moving on said screw; positioning said ball nut inside of said guide tube and said ball nut being capable of moving inside of said guide tube; operatively connecting a tubular member with said ball nut and said tubular member being capable of moving with said ball nut; operatively connecting a first attaching means with said housing; and, operatively connecting a second attaching means with said tubular member.

Further, we have provided a combination of a rotatable member and a power arm for rotating said rotatable member; said power arm comprising: an electric motor having a drive shaft; a gear box having a driven shaft; said electric motor and said gear box operatively connecting together, an adapter operatively connecting with said drive shaft and with said driven shaft; a housing having a cavity for receiving said electric motor and said gear box; said electric motor and said gear box being positioned in said cavity in said housing; a guide tube operatively connecting with said gear box; a screw operatively connecting with said gear box and being in a driven relationship with respect to said gear box; a ball nut mounted on said screw and being capable of moving on said screw; said ball nut being inside of said guide tube and being capable of moving inside of said guide tube; a tubular moveable member connecting with said ball nut and moving with said ball nut; a first attaching means operatively connecting with said housing; and, a second attaching means operatively connecting with said tubular member; said combination comprising: a bearing means; said first attaching means operatively connecting with said bearing means; and, said second attaching means operatively connecting with said rotatable member.

Also, we have provided a process for making a combination of a rotatable member and a power arm for rotating said rotatable member, said process comprising: selecting an electric motor having a drive shaft; selecting a gear box having a driven shaft; operatively connecting together said electric motor and said gear box; operatively connecting together an adapter with said drive shaft and with said driven shaft; selecting a housing having a cavity for receiving said electric motor and said gear box; positioning said electric motor and said gear box in said cavity; operatively connecting a guide tube with said gear box; operatively connecting a screw with said gear box and with said screw being in a driven relationship with respect to said gear box; mounting a ball nut on said screw and with said ball nut being capable of moving on said screw; positioning said ball nut inside of said guide tube and being capable of moving inside of said guide tube; operatively connecting a tubular member with said ball nut and said tubular member being capable of moving with said ball nut; operatively connecting a first attaching means with said housing; operatively connecting a second attaching means with said tubular member; selecting a bearing means; operatively connecting said bearing means and said first attaching means; and, operatively connecting said rotatable member and said second attaching means.

What we claim as our invention is:

1. A power arm comprising:
   a. an electric motor having a drive shaft;
   b. a gear box having a driven shaft;
   c. said electric motor and said gear box operatively connecting together;
   d. an adapter operatively connecting with said drive shaft and with said driven shaft;
   e. a housing having a cavity for receiving said electric motor and said gear box;
   f. said electric motor and said gear box being positioned in said cavity in said housing;
   g. a guide tube operatively connecting with said gear box;
   h. a screw operatively connecting with said gear box and being in a driven relationship with respect to said gear box;
   i. a ball nut mounted on said screw and being capable of moving on said screw;
   j. said ball nut being inside of said guide tube and being capable of moving inside of said guide tube;
   k. a tubular moveable member connecting with said ball nut and moving with said ball nut;
   l. a first attaching means operatively connecting with said housing; and,
   m. a second attaching means operatively connecting with said tubular member.

2. A power arm according to claim 1 and comprising:
   a. two spaced apart pin means on said screw to limit the travel of said ball nut.

3. A power arm according to claim 1 and comprising:
   a. a positioning means for positioning said electric motor and said adapter and said gear box in said housing.

4. A power arm according to claim 1 and comprising:
   a. said attaching means comprising a rod end having a circular opening;
   b. in said circular opening there is a circular spacer; and,
   c. in said circular spacer there is a rotatable moveable torus having a passageway.

5. A power arm according to claim 1 and comprising:
   a. said adapter being resilient to absorb shock between said motor and said gear box.

6. A power arm according to claim 1 and comprising:
   a. two spaced apart pin means on said screw to limit the travel of said ball nut;
   b. a positioning means for positioning said electric motor and said adapter and said gear box in said housing;
   c. said attaching means comprising a rod end having a circular opening;
   d. in said circular opening there is a circular spacer;
   e. in said circular spacer there is a rotatable moveable torus having a passageway; and,
   f. said adapter to absorb shock between said motor and said gear box.

7. A process for making a power arm and comprising:
   a. selecting an electric motor having a drive shaft;
   b. selecting a gear box having a driven shaft;
   c. operatively connecting together said electric motor and said gear box;
   d. operatively connecting together an adapter with said drive shaft and with said driven shaft;
   e. selecting a housing having a cavity for receiving said electric motor and said gear box;
   f. positioning said electric motor and said gear box in said cavity;
   g. operatively connecting a guide tube with said gear box;
   h. operatively connecting a screw with respect to said gear box and with said screw being in a driven relationship to said gear box;
   i. mounting a ball nut on said screw and with said ball nut being capable of moving on said screw;
   j. positioning said ball nut inside of said guide tube and being capable of moving inside of said guide tube;
   k. operatively connecting a tubular member with said ball nut and said tubular member being capable of moving with said ball nut;

l. operatively connecting a first attaching means with said housing; and, m. operatively connecting a second attaching means with said tubular member.

8. A process according to claim 7 and comprising:
a. positioning two spaced apart pin means on said screw to limit the travel of said ball nut.

9. A process according to claim 7 and comprising:
a. selecting a positioning means for positioning said electric motor and said adapter and said gear box in said housing.

10. A process according to claim 7 and comprising:
a. said attaching means comprising a rod end having a circular opening;
b. in said circular opening there is a circular spacer; and,
c. in said circular spacer there is a rotatable moveable torus having a passageway.

11. A process according to claim 7 and comprising:
a. selecting said adapter to absorb shock between said electric motor and said gear box.

12. A process according to claim 7 and comprising:
a. positioning two spaced apart pin means on said screw to limit the travel of said ball nut;
b. positioning said electric motor and said adapter and said gear box in said housing;
c. said attaching means comprising a rod end having a circular opening;
d. in said circular opening there is a circular spacer;
e. in said circular spacer there is a rotatable moveable torus having a passageway; and,
f. selecting said adapter to absorb shock between said electric motor and said gear box.

13. A power arm made by the process comprising:
a. selecting an electric motor having a drive shaft;
b. selecting a gear box having a driven shaft;
c. operatively connecting together said electric motor and said gear box;
d. operatively connecting together an adapter with said drive shaft and with said driven shaft;
e. selecting a housing having a cavity for receiving said electric motor and said gear box;
f. positioning said electric motor and said gear box in said cavity;
g. operatively connecting a guide tube with said gear box;
h. operatively connecting a screw with said gear box and with said screw being in a driven relationship with respect to said gear box;
i. mounting a ball nut on said screw and with said ball nut being capable of moving on said screw;
j. positioning said ball nut inside of said guide tube and said ball nut being capable of moving inside of said guide tube;
k. operatively connecting a tubular member with said ball nut and said tubular member being capable of moving with said ball nut;
l. operatively connecting a first attaching means with said housing; and,
m. operatively connecting a second attaching means with said tubular member.

14. A power arm made by the process according to claim 13 and comprising:
a. positioning two spaced apart pin means on said screw to limit the travel of said ball nut.

15. A power arm made by the process according to claim 13 and comprising:
a. positioning said electric motor and said adapter and said adapter and said gear box in said housing.

16. A power arm made by the process according to claim 13 and comprising:
a. said attaching means comprising a rod end having a circular opening;
b. in said circular opening there is a circular spacer; and,
c. in said circular spacer there is a rotatable moveable torus having a passageway.

17. A power arm made by the process according to claim 13 and comprising:
a. selecting said adapter to absorb shock between said electric motor and said gear box.

18. A power arm made by the process according to claim 13 and comprising:
a. positioning two spaced apart pin means on said screw to limit the travel of said ball nut;
b. positioning said electric motor and said adapter and said gear box in said housing;
c. said attaching means comprising a rod end having a circular opening;
d. in said circular opening there is a circular spacer;
e. in said circular spacer there is a rotatable moveable torus having a passageway; and,
f. selecting said adapter to absorb shock between said electric motor and said gear box.

19. A combination of a rotatable member and a power arm for rotating said rotatable member:
A. said power arm comprising:
a. an electric motor having a drive shaft;
b. a gear box having a driven shaft;
c. said electric motor and said gear box operatively connecting together;
d. an adapter operatively connecting with said drive shaft and with said driven shaft;
e. a housing having a cavity for receiving said electric motor and said gear box;
f. said electric motor and said gear box being positioned in said cavity in said housing;
g. a guide tube operatively connecting with said gear box;
h. a screw operatively connecting with said gear box and being in a driven relationship with respect to said gear box;
i. a ball nut mounted on said screw and being capable of moving on said screw;
j. said ball nut being inside of said guide tube and being capable of moving inside of said guide tube;
k. a tubular moveable member connecting with said ball nut and moving with said ball nut;
l. a first attaching means operatively connecting with said housing; and,
m. a second attaching means operatively connecting with said tubular member;
B. said combination comprising:
n. a bearing means;
o. said first attaching means operatively connecting with said bearing means; and,
p. said second attaching means operatively connecting with said rotatable member.

20. A combination according to claim 19 and comprising:
a. two spaced apart pin means on said screw to limit the travel of said ball nut.

21. A combination according to claim 19 and comprising:

a. a positioning means for positioning said electric motor and said adapter and said gear box in said housing.

22. A combination according to claim 19 and comprising:
   a. said attaching means comprising a rod end having a circular opening;
   b. in said circular opening there is a circular spacer; and,
   c. in said circular spacer there is a rotatable moveable torus having a passageway.

23. A combination according to claim 19 and comprising:
   a. said adapter to absorb shock between said motor and said gear box.

24. A combination according to claim 19 and comprising:
   a. two spaced apart pin means on said screw to limit the travel of said ball nut;
   b. a positioning means for positioning said electric motor and said adapter and said gear box in said housing;
   c. said attaching means comprising a rod end having a circular opening;
   d. in said circular opening there is a circular spacer;
   e. in said circular spacer there is a rotatable moveable torus having a passageway; and,
   f. said adapter to absorb shock between said motor and said gear box.

25. A process for making a combination of a rotatable member and a power arm for rotating said rotatable member, said process comprising:
   a. selecting an electric motor having a drive shaft;
   b. selecting a gear box having a driven shaft;
   c. operatively connecting together said electric motor and said gear box;
   d. operatively connecting together an adapter with said drive shaft and with said driven shaft;
   e. selecting a housing having a cavity for receiving said electric motor and said gear box;
   f. positioning said electric motor and said gear box in said cavity;
   g. operatively connecting a guide tube with said gear box;
   h. operatively connecting a screw with said gear box and with said screw being in a driven relationship with respect to said gear box;
   i. mounting a ball nut on said screw and with said ball nut being capable of moving on said screw;
   j. positioning said ball nut inside of said guide tube and being capable of moving inside of said guide tube;
   k. operatively connecting a tubular member with said ball nut and said tubular member being capable of moving with said ball nut;
   l. operatively connecting a first attaching means with said housing;
   m. operatively connecting a second attaching means with said tubular member;
   n. selecting a bearing means;
   o. operatively connecting said bearing means and said first attaching means; and,
   p. operatively connecting said rotatable member and said second attaching means.

26. A process according to claim 25 and comprising:
   a. positioning two spaced apart pin means on said screw to limit the travel of said ball nut.

27. A process according to claim 25 and comprising:
   a. selecting a positioning means for positioning said electric and said adapter and said gear box in said housing.

28. A process according to claim 25 and comprising:
   a. said attaching means comprising a rod end having a circular opening;
   b. in said circular opening there is a circular spacer; and,
   c. in said circular spacer there is a rotatable moveable torus having a passageway.

29. A process according to claim 25 and comprising:
   a. selecting said adapter to absorb shock between said electric motor and said gear box.

30. A process according to claim 25 and comprising:
   a. positioning two spaced apart pin means on said screw to limit the travel of said ball nut;
   b. selecting a positioning means for positioning said electric motor and said adapter and said gear box in said housing;
   c. said attaching means comprising a rod end having a circular opening;
   d. in said circular opening there is a circular spacer;
   e. in said circular spacer there is a rotatable moveable torus having a passageway; and,
   f. selecting said adapter to absorb shock between said electric motor and said gear box.

31. A combination of a rotatable member and a power arm for rotating said rotatable member made by the process comprising:
   a. selecting an electric motor having a drive shaft;
   b. selecting a gear box having a driven shaft;
   c. operatively connecting together said electric motor and said gear box;
   d. operatively connecting together an adapter with said drive shaft and with said driven shaft;
   e. selecting a housing having a cavity for receiving said electric motor and said gear box;
   f. positioning said electric motor and said gear box in said cavity;
   g. operatively connecting a guide tube with said gear box;
   h. operatively connecting a screw with said gear box and with said screw being in a driven relationship to said gear box;
   i. mounting a ball nut on said screw and with said ball nut being capable of moving on said screw;
   j. positioning said ball nut inside of said guide tube and being capable of moving inside of said guide tube;
   k. operatively connecting a tubular member with said ball nut and said tubular member being capable of moving with said ball nut;
   l. operatively connecting a first attaching means with said housing;
   m. operatively connecting a second attaching means with said tubular member;
   n. selecting a bearing means;
   o. operatively connecting said bearing means and said first attaching means; and,
   p. operatively connecting said rotatable member and said second attaching means.

32. A combination according to claim 31 and comprising:
   a. positioning two spaced apart pin means on said screw to limit the travel of said ball nut.

33. A combination according to claim 31 and comprising:

a. positioning said electric motor and said adapter and said gear box in said housing.

34. A combination according to claim 31 and comprising:
   a. said attaching means comprising a rod end having a circular opening;
   b. in said circular opening there is a circular spacer; and,
   c. in said circular spacer there is a rotatable moveable torus having a passageway.

35. A combination according to claim 31 and comprising:
   a. selecting said adapter to absorb shock between said electric motor and said gear box.

36. A combination according to claim 31 and comprising:
   a. positioning two spaced apart pin means on said screw to limit the travel of said ball nut;
   b. selecting a positioning means for positioning said electric and said adapter and said gear box in said housing;
   c. said attaching means comprising a rod end having a circular opening;
   d. in said circular opening there is a circular spacer;
   e. in said circular spacer there is a rotatable moveable torus having a passageway; and,
   f. selecting said adapter to absorb shock between said electric motor and said gear box.

* * * * *